July 5, 1932.  C. W. P. HEYLANDT  1,866,514

APPARATUS FOR PREPARING PRESSURE GASES

Filed Oct. 5, 1927

INVENTOR:
Christian Wilhelm Paul Heylandt
BY: Reeves, Boyce & Bakelar
ATTORNEYS.

Patented July 5, 1932

1,866,514

UNITED STATES PATENT OFFICE

CHRISTIAN WILHELM PAUL HEYLANDT, OF BERLIN-SUDENDE, GERMANY, ASSIGNOR TO FLUGA AKTIEN-GESELLSCHAFT, OF ST. MORITZ, SWITZERLAND

APPARATUS FOR PREPARING PRESSURE GASES

Application filed October 5, 1927, Serial No. 224,268, and in Germany October 18, 1926.

The present invention relates to apparatus for containing liquefied gases of a character which is adapted to supply the same in the gas-phase at different desired pressures. The invention has for its object generally an improved arrangement for gasifying liquefied gases in their containers in a quick and expeditious manner with relatively small losses caused by heat leakage and the like.

More specifically, it is an object of the invention to provide a container for liquefied gas having draw-off connections which are so arranged with reference to their environment and the walls of the container that a relatively small amount of heat is transferred from the outside to the liquid in the container.

A further object of the invention is to provide a container of the character indicated which is provided with inner and outer vessels constructed of a material in which the expansion does not vary appreciably even at the lowest temperatures.

A still further object of the invention is to provide a container of the character indicated, with internal means for conserving the refrigerating effect of the gas which may be withdrawn or evaporated within the container.

Other objects of the invention will in part be obvious and will in part appear hereinafter.

The invention accordingly comprises the features of construction, combination of elements, and arrangement of parts, which will be exemplified in the construction hereinafter set forth and the scope of the application of which will be indicated in the claims.

Figure 1:
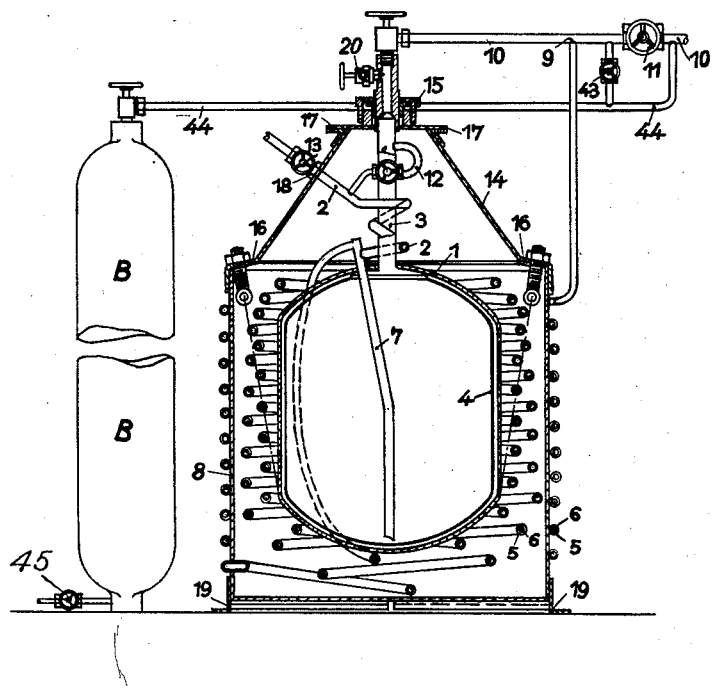
Figure 2:
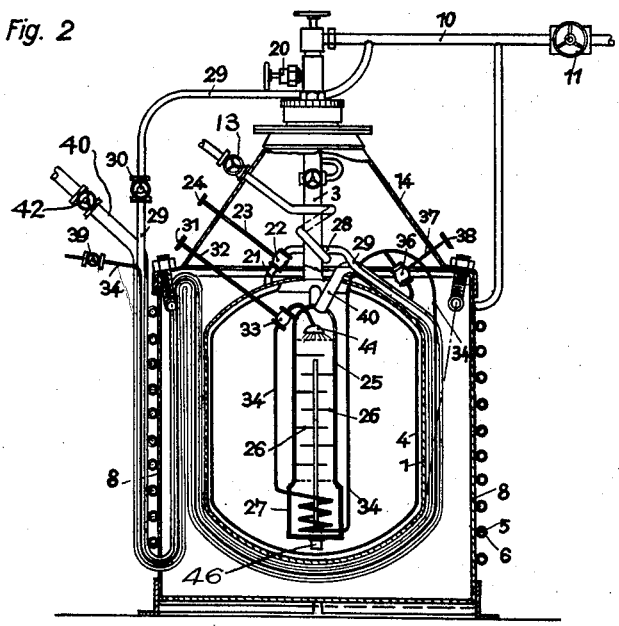

For a fuller understanding of the nature and objects of the invention, reference should be had to the following detailed description taken in connection with the accompanying drawing, in which:

Fig. 1 is a view mainly in vertical central section of an apparatus constructed in accordance with the invention; and Fig. 2 is a similar view in vertical central section of a modified form of apparatus.

Referring now to the drawing and particularly to Fig. 1, 1 denotes a vessel for holding liquefied gas, the outer wall of which, sometimes designated a "pressure vessel", is made sufficiently strong to resist relatively high internal pressures; the vessel having a relatively long narrow neck 3. Within the vessel 1 is preferably disposed an inner receptacle or basket 4 which is made of a suitable ductile metal, for example tin, is relatively thin and is spaced from the inner surface of the vessel 1 to provide a relatively narrow chamber or gas space about the receptacle in order to reduce the amount of heat that would otherwise pass thereto.

The receptacle 4 is open at the top so as to communicate with the gas space; care being taken when filling the receptacle with liquid to avoid any overflow of liquid into the gas space. By this arrangement it is seen that the pressures on the two sides of the wall of the receptacle are always substantially in equilibrium and strain in the thin metal of the wall of the receptacle avoided.

The vessel 1 is enclosed within and supported in spaced relation to the walls of a casing 8 that has a base 19 and a cover 14; the latter being shown as frusto-conical in form. The space between the vessel and the walls of casing 8 is substantially filled with a suitable non-combustible insulating material, for example slag wool or infusorial earth, in order to provide an insulating envelope for the liquid holding vessel.

A filling and withdrawal tube 7 is passed through the wall of the vessel 1 and extends to a point near the bottom of receptacle 4. For filling purposes this tube has a branch pipe or tube 2, which is preferably passed directly through the cover 14 and is arranged to be connected to a source of liquid supply (not shown in the interests of clearness). A valve 13 is provided to control the passage of liquid through the pipe 2, which may be coiled about the neck 3 of the vessel 1 in order to effect heat exchange between the gas in neck 3 and the liquid when passing in pipe 2. A controlled by-pass connection 12 is also advantageously provided between the pipe 2 and the neck 3 so that any gas that may be evolved by evaporation of the liquid when passing through pipe 2 may be immediately withdrawn and supplied to the body of gas in the neck 3 without passing through the liquid in the receptacle 4.

A second branch pipe or tube for withdrawal purposes is also arranged to communicate with tube 7. This second branch pipe is here shown as a double coil 5—6 that is arranged to have a portion leading from the top of tube 7 down over the side of vessel 1 to a point near the base 19 from which point it again is led upwardly in a series of convolutions having increasing diameters as the top of the casing 8 is approached, the convolutions at first being disposed close to the vessel 1. From the top, still within the insulating space of casing 8, the coil descends in a second series of convolutions which have increasing diameters (with the exception of the lowermost turns) until a point near the bottom of the casing 8 is reached. From this point the coil is then led through the casing wall and thence upwardly in a third series of convolutions secured on the outside of the casing 8. The outer end of this coil communicates at 9 with a gas withdrawal conduit 10, leading from the neck 3 and provided with a discharge control valve 11; the outside portion of neck 3 being preferably arranged to minimize the conduction of heat to the vessel 1 as far as practical and in consequence is shown as having a separable portion secured in place by means of a stuffing box 15 on the crown of cover 14 and provided with a vent valve 20. In addition to the stuffing box 15, the casing 8 has its other joints preferably made air-tight and accordingly is shown with packings 16, 17 and 18 inserted at the joints in the manner illustrated.

The gas withdrawal conduit is adapted to supply gas directly to a consuming device at any desired pressure, the pressure depending of course on the adjustment of the valve 11. As the rate of gas withdrawal from the conduit 10 may at times exceed that at which gas is evolved from the vessel 1, it is desirable to have a supply of gas under relatively high pressure in reserve. This is accomplished by providing a gas receiver or cylinder B having a pipe connection 44 leading to the conduit 10 from which it is filled when the gas demand is nil or less than the rate at which gas is evolved in the container of the present invention. To permit the receiver B being conveniently filled when the gas demand is nil and the valve 11 closed, a valved by-pass is preferably provided, as shown at 43, connecting pipe 44 with conduit 10. The receiver B may also have an independent valved outlet, as shown at 45, at its lower end.

The operation of the liquid containing apparatus above described is as follows: Liquefied gas is first introduced to the vessel 1 by the conduit means 2 and 7. The gas which is evolved during the filling process is first raised by self-compression to a desired pressure and then led to the gas receiver B by way of conduit 44, in case there is no demand for compressed gas at the time of the filling operation. During this filling operation, the by-pass at 12 may be opened to convey the gas evolved during the initial cooling of the filling means. The normal withdrawal of gas from the container here provided may be had either through the neck 3 from the gas space above the liquid in vessel 1, or from vaporization of liquid withdrawn through the coil 5—6.

If it is desired to withdraw gas from the coil, communication between pipe 10 and the gas space above the liquid level is shut off so that there is produced an excess pressure in the vessel, at the end of the coil within the vessel 1. In this manner the liquid is driven into the coil under pressure so that upon withdrawal of gas from the coil through pipes 9 and 10 the liquid contents of the vessel is forced into the coil to take the place of the gas removed therefrom. The evaporation of the liquid is not in excess of the quantity of gas removed. If it is desired to draw off from the space above the liquid level, this gas space is opened to communication with the pipe conduit 10. At this time, although the coil enters the consumption conduit at 9, nevertheless no liquid will evaporate from the coil, for the reason that the pressure on the liquid in the vessel is the same as that on the liquid in the coil. This pressure equalization takes place at 9.

In this connection, it may be stated that the coil may be constructed of any desired length and may also be of any definite diameter. These constructional dimensions depend upon the character of the liquid to be gasified. For instance, the evaporation heat required for methane is about $2\frac{1}{2}$ times as great as that for oxygen. It follows, therefore, that it would be necessary to make the coil for the gasification of methane longer, from point to point, in the vessel, than for oxygen.

It will be seen that the arrangement of the coil 5—6 in the insulating space about the vessel 1, in which the inner turns are in close proximity to the vessel, while the outer turns progressively increase their diameter as they approach the casing 8, is such as to utilize the heating effect of the insulating envelope. It will be perceived that there is a more or less constant flow of heat in the insulating envelope from the outside of casing 8 to the outer wall of the vessel 1. Such heat as the insulating envelope contains may, therefore, be absorbed by the liquid withdrawn through the coil 5—6 as it progressively enters the warmer zones in its advance from the inner end of the coil to the outside atmosphere, that is, the farther the liquid progresses along the turns of the coil toward the outside, the more the liquid will be heated from the outside, with consequent greater evolution of gas.

While the withdrawal of cold gas material from the vessel 1 involves heating in order to supply the same as compressed gas, at a predetermined desired pressure in the apparatus shown in Fig. 1, which involves dissipating the refrigerating effect initially obtained by the process of liquefaction, it is contemplated conserving this effect in certain forms of practicing the present invention, the containing apparatus for the liquefied gas in such instances being modified to conserve the refrigerating effect by means of heat exchangers associated with the withdrawal conduits. An arrangement for carrying out this form of the invention is shown in the apparatus illustrated in Fig. 2.

In Fig. 2, the apparatus illustrated employs a vessel 1 having a restricted neck 3 supported and surrounded by a casing 8, having the intervening space substantially filled with insulating material, which construction may be substantially the same as that disclosed in Fig. 1, with the exception that a by-pass 21 is shown for providing communication between the neck 3 and the gas space about the receptacle 4, the by-pass being controlled by a valve 22 actuated from without by the stem 23 and hand wheel 24; the filling and withdrawal means comprising conduits 2, 7, and coils 5—6 being also the same, but are partially omitted from illustration for the sake of clearness.

Supplementary gas withdrawal means are here provided in the form of a conduit 29 communicating at its inner end with the neck 3, as indicated at 28, this conduit having successive portions disposed in the insulating material so that the temperature rise therealong coincides approximately with the temperature increase in the insulating material in substantially the same manner as described above in connection with coil 5—6, the outer end of this conduit discharging into the conduit 10, and being provided with a flow control means here shown as a valve at 30. The heat exchanging means associated with this supplementary gas withdrawal conduit comprises a conduit 34, here shown as having a sufficiently small diameter, to be disposed within the conduit 29 and to traverse the same along the axis thereof until a point is reached near the outer end of the conduit 29, from which the conduit 34 is led out independently and provided with a valve 39 for controlling the ingress of compressed air or other gas thereto; the conduit 34 preferably having by-pass communication with the conduit 40, which is here shown as controlled by a valve 36 actuated by a stem 37 and hand wheel 38.

In carrying out the further conservation of the refrigerating effect here desired, the inner end of the conduit 34 depending into the vessel 1 is shown leading to a distributor 41 of a rectifying column 25. This latter is shown as housed within the vessel 1 and provided with the usual counter-current contacting means 26 and an evaporator or kettle 27 in the lower end, vaporization being effected in the kettle by a coiled portion of the conduit 34, which is preferably made to pass therethrough, the discharge of fluid from the coil 34 through the distributor 41 being preferably controlled by valve 33, shown as actuated by stem 32 and hand wheel 31. The non-condensable constituents of the products of rectification within the column 25 are withdrawn through a conduit 40, which is passed through the top of the vessel 1 and also arranged in heat exchanging relation with the supplemental withdrawal conduit 29. The conduit 40 is of relatively large diameter and is preferably arranged to envelope the conduit 29, following the same to a point on the outside of the casing 8 where exit of the withdrawn products is controlled by a valve 42. The rectified product which collects in the bottom of the column 25 may be passed directly into the vessel 1 through a suitable outlet from the column here shown at 46.

The operation of this modified form of apparatus is the same as that shown in Fig. 1, except as the use of the triple conduit system 29, 34, 40 and the rectifying column 25 are involved. When compressed gas is withdrawn through the conduit 29, the refrigerating effect of this gas is conserved by admitting compressed gas to the conduit 34, which is accomplished by opening the valve 39. The compressed gas being withdrawn in order to supply a consuming device, is passed in heat exchanging relation with the warm gas entering through the conduit 34, so that the refrigerating effect of the cold gases initially passing out through the conduit 29 has been substantially transferred to the gas entering the rectifying column 25. Here, a further refrigerating effect is practiced in the rectifying column, so that a liquefied product such as liquid oxygen is supplied to the vessel 1. The conduit 40 serves as the means for drawing off nitrogen and other uncondensable gases from the column 25, and follows the conduit 29, so as to transfer its refrigerating effect to the gas material entering the rectifying column 25. By opening the by-pass valve at 36 and closing the valve 33, the rectifying column may be short-circuited by way of the by-pass, whereupon the gas material supplied by the conduit 34 will pass directly into the conduit 40, thereby increasing the rate of evaporation.

Having described my invention, what I claim as new and desire to secure by Letters Patent, is:

1. In a container for liquefied gases, the combination with a vessel for holding the liquefied gas provided with an insulating envelope, of a coil connected to said vessel, leading to a point in the outside atmosphere and provided with successive portions disposed in said insulating envelope in a manner such that the temperature drop therealong from the outer to the inner end is approximately coincident with the temperature gradient in said envelope.

2. In a container for liquefied gases, the combination with a vessel for holding the liquefied gas provided with an insulating envelope, of conduit means connected to said vessel, leading to a point in the outside atmosphere and having the portions which are first connected to said vessel disposed in close proximity thereto and subsequent portions thereof disposed more distantly in parts of said envelope.

3. In a container for liquefied gases, the combination with a vessel for holding the liquefied gas provided with an insulating envelope, of conduit means connected to said vessel, leading to a point in the outside atmosphere and provided with a series of convolutions disposed in said envelope so as to have increasing proximity to said vessel with the approach to the inner end.

4. In a container for liquefied gases, the combination with a vessel for holding the liquefied gas provided with an insulating envelope, of conduit means connected to said vessel, leading to a point in the outside atmosphere and provided with a series of convolutions disposed in said envelope and arranged to have their radial distances from said vessel increase progressively with the temperature rise along said means as the outer end is approached from within.

5. In a container for liquefied gases, the combination with a vessel for holding the liquefied gas provided with a casing supporting and surrounding the same and having the intervening space substantially filled with heat insulating material, of a liquid withdrawal conduit having its inner end depending into said vessel and leading to an outer end without said casing and composed of a reentrant series of convolutions having diameters which progressively increase with the temperature rise from the depending inner end to the outer end.

6. In a container for liquefied gases, the combination with a vessel provided with a relatively thick outer wall and a relatively thin inner receptacle for holding the liquefied gas spaced from said wall, of a casing surrounding and supporting said vessel having the intervening space substantially filled with heat insulating material, and conduit means connected to said vessel having portions disposed in heat exchanging relation with said insulating material and leading to points on the exterior of said casing.

7. In a container for liquefied gases, the combination with a vessel provided with a relatively thick outer wall and a relatively thin inner receptacle for holding the liquefied gas spaced from said wall, of means for effecting communication between the space about said receptacle within said vessel and the interior of said receptacle, of an insulating envelope substantially surrounding said vessel, and a liquid phase withdrawal conduit connected to said vessel having a portion disposed in heat exchanging relation with said insulating envelope and leading to a point on the exterior thereof.

8. In a container for liquefied gases, the combination with a vessel for holding the liquefied gas provided with an insulating envelope, of withdrawal means connected to said vessel, leading to a point in the outside atmosphere, and heat exchanging means associated with said withdrawal means and said vessel whereby the refrigerating effect of said liquefied gas is conserved within said insulating envelope.

9. In a container for liquefied gases, the combination with a vessel for holding the liquefied gas provided with an insulating envelope, of withdrawal means connected to said vessel, leading to a point in the outside atmosphere, composed of successive portions disposed in said insulating envelope in a manner such that the temperature rise therealong progresses from the inner to the outer end through said envelope, and heat exchanging means associated with said withdrawal means and comprising a portion within said vessel for conserving the refrigerating effect of the liquefied gas within said insulating envelope.

In testimony whereof I have signed my name to this specification.

CHRISTIAN WILHELM PAUL HEYLANDT.